United States Patent [19]

Hagiwara

[11] Patent Number: 5,294,401
[45] Date of Patent: Mar. 15, 1994

[54] MEMBRANE TYPE OF OXYGENATOR AND METHOD FOR PRODUCTION THEREOF

[75] Inventor: Kazuhiko Hagiwara, Fuji, Japan

[73] Assignee: Terumo Kabushiki Kaisha, Tokyo, Japan

[21] Appl. No.: 966,573

[22] PCT Filed: Mar. 17, 1988

[86] PCT No.: PCT/JP88/00276
§ 371 Date: Sep. 15, 1989
§ 102(e) Date: Sep. 15, 1989

[87] PCT Pub. No.: WO88/06898
PCT Pub. Date: Sep. 22, 1988

Related U.S. Application Data

[63] Continuation of Ser. No. 415,321, Sep. 15, 1989, abandoned.

[30] Foreign Application Priority Data

Mar. 18, 1987 [JP] Japan .................................. 62-63621

[51] Int. Cl.$^5$ ............................................. A61M 1/18
[52] U.S. Cl. ........................................ 422/48; 422/44; 128/DIG. 3; 210/500.24; 210/500.27; 210/321.62; 261/DIG. 28; 95/54; 96/8
[58] Field of Search ............... 422/44, 48; 55/16, 158; 210/321.62, 321.71, 321.81, 321.9, 500.23, 500.24, 500.27, 506, 508; 128/DIG. 3; 261/DIG. 28

[56] References Cited

U.S. PATENT DOCUMENTS

| | | | |
|---|---|---|---|
| 3,930,886 | 6/1976 | Mesiti et al. | 264/49 X |
| 3,969,240 | 7/1976 | Kolobow et al. | 210/646 |
| 4,093,515 | 6/1978 | Kolobow | 435/2 |
| 4,239,729 | 12/1980 | Hasegawa et al. | 422/48 |
| 4,374,802 | 2/1983 | Fukasawa | 422/48 |
| 4,622,206 | 11/1986 | Torgeson | 422/48 |
| 4,781,889 | 11/1988 | Fukasawa et al. | 422/48 |
| 4,909,989 | 3/1990 | Fukazawa et al. | 422/48 |

FOREIGN PATENT DOCUMENTS

| | | |
|---|---|---|
| 0164025 | 12/1985 | European Pat. Off. . |
| 0223626 | 5/1987 | European Pat. Off. . |
| 56-145858 | 4/1980 | Japan . |
| 606662 | 9/1980 | Japan . |
| 5814906 | 7/1981 | Japan . |

Primary Examiner—James C. Housel
Assistant Examiner—Harold Y. Pyon
Attorney, Agent, or Firm—Burns, Doane, Swecker & Mathis

[57] ABSTRACT

A membrane type oxygenator for effecting exchange of gases with a porous gas-exchange membrane possessing minute through pores forming a path for gas, which membrane type oxygenator is characterized by the fact that minute particles are retained in the minute pores of the porous gas-exchange membrane to permit a decrease in the cross-sectional area of the path for gas and as blood anticoagulant is retained in the minute particles or between the minute particles, and it is manufactured assembling a membrane type oxygenator containing a porous gas-exchange membrane possessing minute through pores forming a path for gas, then causing a dispersion of minute particles to flow through the interior of the membrane type oxygenator thereby allowing the minute pores to retain the minute particles and permitting a decrease in the cross-sectional area of the path for gas, removing the dispersion remaining within the membrane type oxygenator, and further causing a liquid containing a blood anticoagulant to flow through the interior of the oxygenator and allowing the liquid to pass through the minute pores of the gas-exchange membrane thereby inducing deposition of the blood anticoagulant on the minute particles.

16 Claims, 3 Drawing Sheets

MEMBRANE TYPE OF OXYGENATOR AND METHOD FOR PRODUCTION THEREOF

This application is a continuation of application Ser. No. 07/415,321, filed Sep. 15, 1989, now abandoned.

TECHNICAL FIELD

This invention relates to a membrane type oxygenator for removing carbon dioxide from blood and adding oxygen to the blood and to a method for the production thereof.

BACKGROUND ART

The oxygenators developed to date are broadly classified into bubble type oxygenators and membrane type oxygenators. The membrane type oxygenators fall under the laminate type, the coil type, and the hollow fiber type. The membrane type oxygenators excel over the bubble type oxygenators since the membrane type oxygenators cause only slight blood injuries such as hemolysis, protein denaturation and blood coagulation as compared with the bubble type oxygenators, and have been gaining in popularity in recent years. In the membrane type oxygenators, those which use porous gas-exchange membranes have growing utility because they possess a high gas exchange capacity. Membrane type oxygenators using such a porous gas-exchange membrane are disclosed in Japanese Patent Laid-Opens SHO 54(1979)-160,098 and SHO 57(1982)-136,456, for example.

When these conventional membrane type oxygenators are used for extra-corporeal blood circulation as in the cardiotomy and the extra-corporeal membrane oxygenation (ECMO), for example, the so-called general heparinization or the administration of heparin is used to prevent blood coagulation within the oxygenator and the path for extra-corporeal circulation. The general heparinization, however, has a disadvantage since it disrupts the normal intra-corporeal blood coagulating ability, and hemorrhaging from the cut and the operated part cannot be prevented. As a means of decreasing the amount of heparin to be injected, there has been devised a method of continuously injecting a minute amount of heparin into the path for extra-corporeal circulation. This method, however, includes a possibility that the hemorrhage will not be curbed as effectively as expected because of the difficulty experienced in the control of the amount of heparin to be injected or, conversely, a possibility that the injection will induce blood coagulation on the surface of the gas-exchange membrane in the oxygenator and occlusion of the hollow-fiber membrane used as the gas-exchange membrane.

This invention, therefore, is aimed at providing a membrane type oxygenator which effects continuous release of a blood anticoagulant to preclude blood coagulation on the surface of the gas-exchange membrane and occlusion of the gas-exchange membrane particularly in the interior of the membrane type oxygenator even when the amount of heparin to be administered is small.

DISCLOSURE OF INVENTION

The object described above is accomplished by a membrane type oxygenator for effecting exchange of gases with a porous gas-exchange membrane, possessing minute through pores for passage of gas. The membrane type oxygenator is characterized by the fact that minute particles are retained within the minute pores in the porous gas-exchange membrane to decrease the cross-sectional area of the passage of gas and a blood anticoagulant is retained in the minute particles or between the adjacent minute particles.

This invention is a membrane type oxygenator, wherein the gas-exchange membrane has a wall thickness in the range of 5 to 80 $\mu m$ and contains minute pores possessing a diameter in the range of 0.01 to 5 $\mu m$. This invention is also a membrane type oxygenator, wherein the gas-exchange membrane comprises hollow fiber membranes. Further, this invention is a membrane type oxygenator, wherein the hollow fiber membranes possess inside diameters in the range of 100 to 1,000 $\mu m$. This invention is a membrane type oxygenator, wherein the minute particles possess a diameter smaller than the minute pores. This invention is also a membrane type oxygenator, wherein the minute pores of the gas-exchange membrane are crammed with the minute particles in such a manner that the gaps occurring between the adjacent minute particles form a path for gas. Further, this invention is a membrane type oxygenator, wherein the minute particles are formed of silica. This invention is a membrane type oxygenator, wherein the minute particles possess diameter in the range of 20 to 10,000 Å. This invention is also a membrane type oxygenator, wherein the blood anticoagulant is heparin. Further, this invention is a membrane type oxygenator, wherein the gas-exchange membrane is a porous membrane made of a polyolefin. This invention is a membrane type oxygenator, wherein the surface of the gas-exchange membrane on the side destined to contact the blood, at least in the areas containing the minute pores, is coated with a water-insoluble resin. This invention is also a membrane type oxygenator, wherein the minute pores of the gas-exchange membrane are filled with the minute particles, the minute particles exposed on the surface of the gas-exchange membrane on the side destined to contact the blood are coated with a water-insoluble resin, and the coating with the water-insoluble resin is formed in such a manner as to curb the otherwise possible release of the blood anticoagulant retained in or between the minute particles. Further, this invention is a membrane type oxygenator, wherein the coating with the water-insoluble resin is so formed as to cover the entire surface of the gas-exchange membrane on the side destined to contact the blood. This invention is a membrane type oxygenator, wherein the minute particles on the surface of the gas-exchange membrane on the side destined to contact the gas are coated with a hydrophobic resin. This invention is also a membrane type oxygenator, wherein the hydrophobic resin is a resin possessing a high permeability to gas. Further, this invention is a membrane type oxygenator, wherein the coating with the hydrophobic resin is formed so as to cover the entire surface of the gas-exchange membrane on the side destined to contact the gas.

The object described above is also accomplished by a method for the production of a membrane type oxygenator characterized by the steps of assembling a membrane type oxygenator containing a porous gas-exchange membrane possessing minute through pores forming a path for gas, then causing a dispersion of minute particles to flow through the interior of the membrane type oxygenator thereby allowing the minute pores to retain the minute particles and permitting a decrease in the cross-sectional area of the path for gas, removing the dispersion remaining within the membrane type oxygenator, and further causing a liquid containing a blood anticoagulant to flow through the interior of the oxygenator and allowing the liquid to pass through the minute pores of the gas-exchange membrane thereby inducing deposition of the blood anticoagulant on the minute particles.

The invention also includes a method for production of a membrane type oxygenator, wherein the flow of the dispersion into the oxygenator is effected under application of pressure. This invention is further a method for production of membrane type oxygenator, wherein the porous gas-exchange membrane is a porous hydrophobic membrane and the porous hydrophobic membrane is brought into contact with an alcohol by way of a treatment for the impartation of hydrophilicity before start of the flow of the dispersion of minute particles in water as a dispersion medium. This invention is also a method for the production of a membrane type oxygenator, wherein porous hollow fiber membranes possessing a wall thickness in the range of 5 to 80 μm, a porosity in the range of 20 to 80%, and pore diameters in the range of 0.01 to 5 μm are used as the porous gas-exchange membrane and a dispersion of minute particles possessing diameters smaller than the diameters of the minute pores is passed through the porous hollow fiber membranes from the inside to the outside to induce flow of the minute particles through the minute pores of the porous hollow fiber membranes. This invention is a method for the production of a membrane type oxygenator wherein the minute particles are formed of silica. This invention is also a method for production of a membrane type oxygenator, wherein the deposition of the blood anticoagulant on the minute particles is followed by a step of causing a water-insoluble resin solution to flow through the membrane type oxygenator via the blood inlet side to form a coating of the water-insoluble resin on the surface of the gas-exchange membrane on the side destined to contact the blood. Further, this invention is a method for the production of a membrane type oxygenator, wherein the water-insoluble resin solution comprises a water-insoluble resin and a solvent. This invention is a method for the production of a membrane type oxygenator, wherein the deposition of the blood anticoagulant on the minute particles is followed by a step of causing a hydrophobic resin solution to flow through the membrane type oxygenator via the gas inlet side to form a coating of the hydrophobic resin on the surface of the gas-exchange membrane on the side destined to contact the gas. This invention is also a method for the production of a membrane type oxygenator, wherein the hydrophobic resin solution comprises a hydrophobic resin and a solvent. Further, this invention is a method for the production of a membrane type oxygenator, wherein the deposition of the blood anticoagulant on the minute particles is followed by a step of causing a water-insoluble resin solution to flow through the membrane type oxygenator via the blood inlet side to form a coating of the water-insoluble resin on the surface of the gas-exchange membrane on the side destined to contact the blood and a step of causing a hydrophobic resin solution to flow through the membrane type oxygenator via the gas inlet side to form a coating of the hydrophobic resin on the surface of the gas-exchange membrane on the side destined to contact the gas.

Further, the object described above is accomplished by a method for the production of a membrane type oxygenator, characterized by the steps of assembling a membrane type oxygenator containing a porous gas-exchange membrane possessing minute through pores forming a path for gas, then causing a dispersion containing a blood anticoagulant and minute particles to flow through the interior of the membrane type oxygenator thereby allowing the minute pores to retain the minute particles in conjunction with the blood anticoagulant and permitting a decrease in the cross-sectional area of the path for gas, and thereafter removing the dispersion remaining inside the membrane type oxygenator.

This invention is also a method for the production of a membrane type oxygenator, wherein the flow of the dispersion into the oxygenator is effected under application of pressure. This invention is also a method for production of a membrane type oxygenator, wherein the porous gas-exchange membrane is a porous hydrophobic membrane and the porous hydrophobic membrane is brought into contact with an alcohol by way of treatment for the impartation of hydrophilicity before start of the flow of the dispersion of minute particles in water as a dispersion medium. Further, this invention is a method for the production of a membrane type oxygenator, wherein porous hollow fiber membranes possessing a wall thickness in the range of 5 to 80 μm, a porosity in the range of 20 to 80%, and pore diameters in the range of 0.01 to 5 μm are used as the porous gas-exchange membrane and a dispersion containing minute particles possessing diameters smaller than the diameters of the minute pores and a blood anticoagulant is passed through the porous hollow fiber membrane from the inside to the outside to induce flow of the minute particles through the minute pores of the porous hollow fiber membranes. This invention is a method for the production of a membrane type oxygenator, wherein the minute particles are formed of silica. This invention is also a method for the production of a membrane type oxygenator, wherein the deposition of the blood anticoagulant on the minute particles is followed by a step of causing a water-insoluble resin solution to flow through the membrane type oxygenator via the blood inlet side to form a coating of the water-insoluble resin on the surface of the gas-exchange membrane on the side destined to contact the blood. Further, this invention is a method for the production of a membrane type oxygenator, wherein the water-insoluble resin solution comprises a water-insoluble resin and a solvent. This invention is a method for the production of a membrane type oxygenator, wherein the deposition of the blood anticoagulant on the minute particles is followed by a step of causing a hydrophobic resin solution to flow through the membrane type oxygenator via the gas inlet side to form a coating of the hydrophobic resin on the surface of the gas-exchange membrane on the side destined to contact the gas. This invention is also a method for the production of a membrane type oxygenator, wherein the hydrophobic resin solution comprises a hydrophobic resin and a solvent. Further, this invention is a method for the production of a membrane type oxygenator, wherein the deposition of the blood anticoagulant on the minute particles is followed by a step of causing a water-insoluble resin solution to flow through the membrane type oxygenator via the blood inlet side to form a coating of the water-insoluble resin on the surface of the gas-exchange membrane on the side destined to contact the blood and a step of causing a hydrophobic resin solution to flow through the membrane type oxygenator via the gas inlet side to form a coating of the hydrophobic resin on the surface of the gas-exchange membrane on the side destined to contact the gas.

BEST MODE FOR CARRYING OUT THE INVENTION

Figure 1:
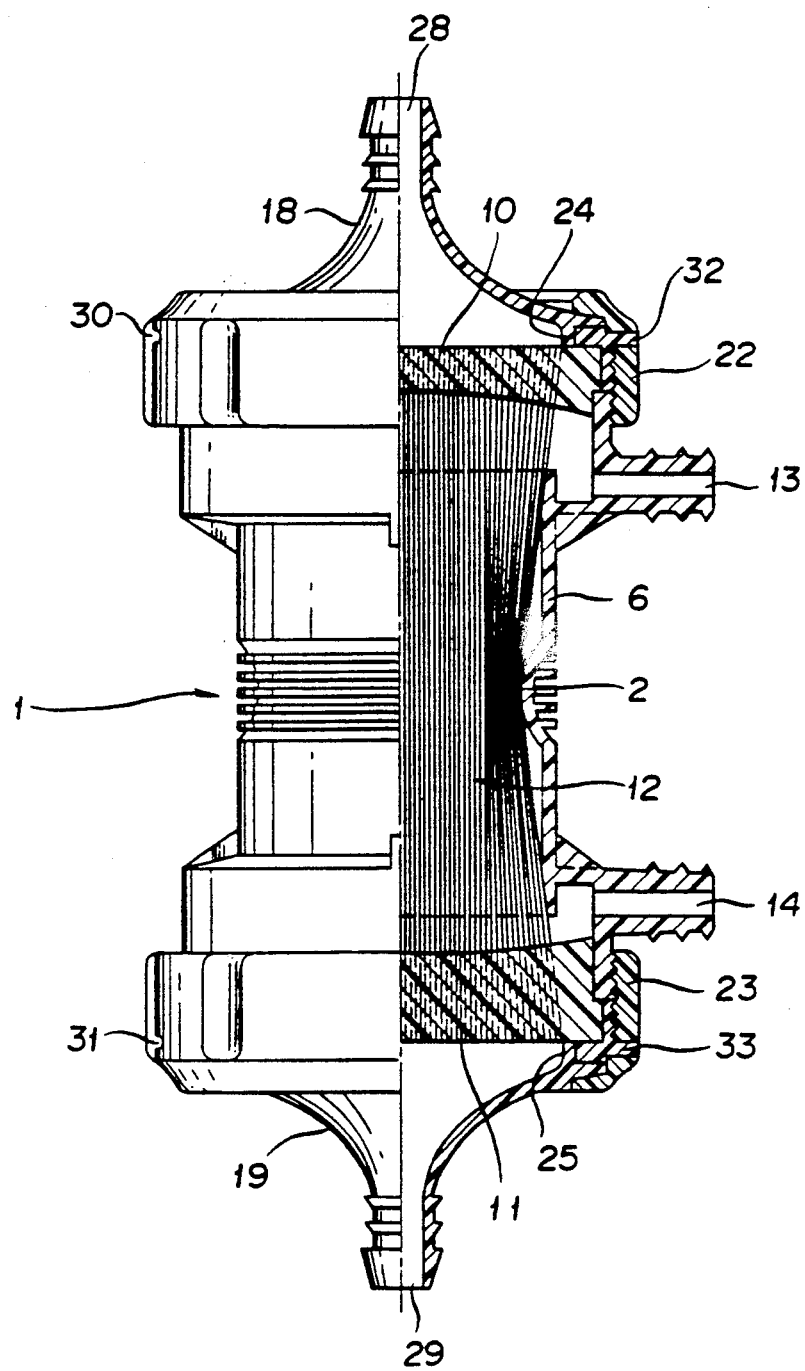
FIG. 1 is a partially sectioned view of a typical membrane type oxygenator as an embodiment of the present invention.

The membrane type oxygenator of this invention will be described below with reference to working examples illustrated in the accompanying drawings.

A membrane type oxygenator 1 of this invention is of the type for effecting exchange of gases with a porous gas-exchange membrane 2 containing minute through pores 3 forming a path for gas. It has minute particles 4 retained in the minute pores 3 of the porous gas-exchange membrane 2 to decrease the cross-sectional area of the path for gas and also has a blood anticoagulant 5 retained in the minute particles 4 or between the adjacent minute particles.

The gas-exchange membrane 2 to be used in the present invention is a porous membrane containing a multiplicity of minute through pores 3. Preferably, the gas-exchange membrane possesses a wall thickness in the range of 5 to 80 $\mu$m, preferably 10 to 60 $\mu$m, a porosity in the range of 20 to 80%, preferably 30 to 60%, and a diameter of minute pores in the range of 0.01 to 5 $\mu$m, preferably 0.01 to 1 $\mu$m.

Figure 2:
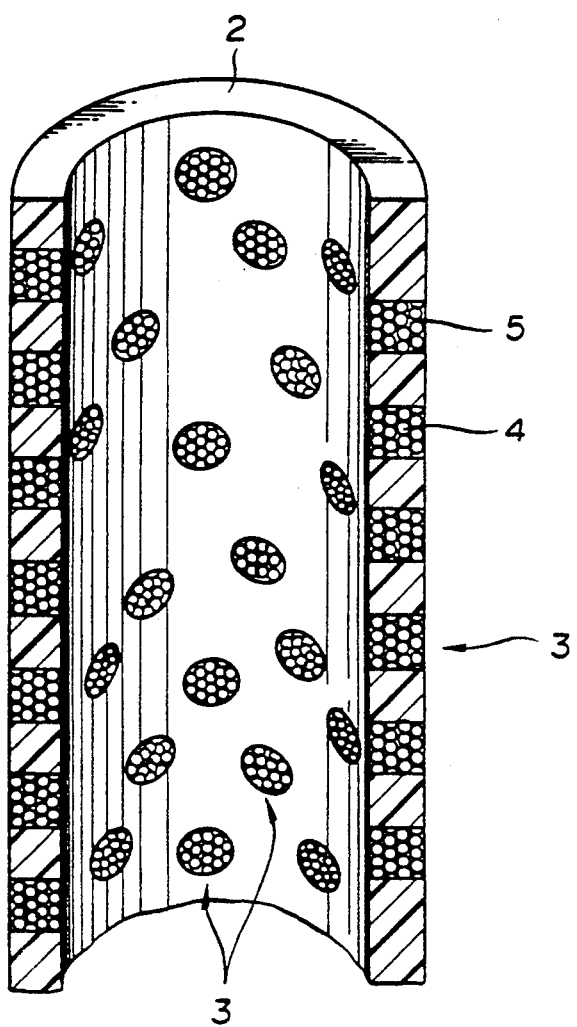
FIGS. 2 to 5 are magnified cross sections illustrating detailed constructions of a gas-exchange membrane in the membrane type oxygenator mentioned above.

The gas-exchange membrane illustrated in FIGS. 1 and 2 is a hollow fiber membrane. The porous hollow fiber membrane is provided in the wall thereof with minute through holes forming a path for gas. The porous hollow fiber membrane, to fulfill the part thereof, preferably possesses an inside diameter in the range of 100 to 1,000 $\mu$m, preferably 100 to 300 m. The gas-exchange membrane may be a flat membrane instead of the hollow fiber membrane.

The minute particles 4 are retained in all the minute pores 3 of the gas-exchange membrane 2 so as to decrease the cross-sectional area of the path for gas formed by the minute pores 3 (the sectional area of the minute pores 3 taken in the axial direction of the gas-exchange membrane 2). To be more specific, the minute pores 3 are crammed with a multiplicity of minute particles 4 having a smaller diameter than the diameter of the minute pores 3. Extremely thin gaps for passage of gas are formed between the adjacent minute particles. In the gas-exchange membrane illustrated in FIG. 2, the minute pores 3 are filled with a multiplicity of minute particles 4 and the gaps consequently occurring between the adjacent minute particles form a path for gas. The minute pores 3 may also be enabled to form a decreased path for gas by attaching the minute particles 4 fast to the inner surface of the gas-exchange membrane 2 or to the outer surface of the gas-exchange membrane through the medium of adhesive agent.

Since the path for gas in the individual minute pores 3 is decreased as described above by the minute particles 4, the gas-exchange membrane 2 is allowed to form between the adjacent minute particle 4 extremely minute gaps such as to elude recognition even by the use of an electron microscope. These extremely minute gaps form a path for gas establishing communication between the inner and outer surfaces of the gas-exchange membrane. Further, a blood anticoagulant 5 is retained in the minute particles 4 or between the adjacent minute particles 4. In regard to the manner of retention of the blood anticoagulant, the case in which the coagulant adheres to the individual minute particles 4, the case in which the anticoagulant adheres to the minute particles so amply as to interconnect the adjacent minute particles, and the case in which the anticoagulant is distributed as discrete particles between the minute particles. The blood anticoagulant is preferably deposited on one or more minute particles. This is because the blood anticoagulant thus held fast to the minute particles can be prevented from being readily released from within the minute pores of the gas-exchange membrane 2.

As the material for the gas-exchange membrane 2, polyolefins such as polypropylene and polyethylene and polytetrafluoroethylene, polysulfone, polyacrylonitrile, cellulose acetate, etc. are usable. Preferably, this material is a hydrophobic macromolecular substance. It is desired to be a polyolefin type resin, particularly polypropylene. The porous membrane of polypropylene can be manufactured by imparting minute pores in the membrane of polypropylene by the method of stretching or the method of solid-liquid phase separation, for example.

Examples of the material for the minute particles 4 to be used in the membrane type oxygenator of the present invention include inorganic substance such as silica, alumina, zirconia, magnesia, barium sulfate, calcium carbonate, silicates, titanium dioxide, silicon carbide, carbon black, and white carbon and macromolecular latexes such as polystyrene latex, styrene rubber (SBR) latex, and nitrile rubber (NBR) latex. In all the materials cited above, silica proves to be particularly desirable. The minute particles are desired to possess an average diameter in the range of 20 to 10,000 Å, preferably 20 to 1,000 Å.

The blood anticoagulant to be used in the membrane type oxygenator of this invention may be any of various blood anticoagulants in popular use. Heparin is the most desirable blood anticoagulant because of its high safety for living organisms.

A hollow fiber membrane type oxygenator as one version of the membrane type oxygenator 1 embodying the present invention is illustrated in an assembled state in FIG. 1. This hollow fiber membrane type oxygenator 1 comprises a tubular housing 6 and a gas-exchange membrane 2 formed of 10,000 to 60,000 porous hollow fiber membrane disposed inside the housing 6 as dispersed throughout the entire interior of the housing 6. The porous hollow fiber membranes are provided in the walls thereof with a multiplicity of minute pores forming a path for gas which establishes communication between the inside and outside of the hollow fiber membranes. In these fine pores, the path for gas has the cross-sectional area thereof decreased as scribed above with the minute particles. Further, the blood anticoagulant is retained in or between the minute particles.

The membrane type oxygenator 1 of the present invention illustrated in FIG. 1 will be described more specifically below. The opposite ends of the hollow fiber membranes are water-tightly fixed to the housing 6 with partition walls 10 and 11 in such a manner that the openings thereof will not be closed. Owing to the partition walls 10 and 11, the interior of the housing 6 is divided into an oxygen chamber 12 as a first substance transfer enclosure defined by the outer walls of the hollow fiber membranes, the inner wall of the housing 4, and the partition walls 10 and a blood flow space as a second substance flow enclosure defined by the inner walls of the hollow fiber membranes. This housing 6 is provided near one end thereof with an inlet port 13 for an oxygen-containing gas and near the other end thereof with an outlet port 14 for the gas. On the outer side of the partition wall 11, a flow path forming member 19 provided with a blood inlet 29 and an annular protuberance 25 is fixed with a thread ring 23 to the housing 6. Similarly on the outer side of the partition wall 10, a flow path forming member 18 provided with a blood outlet 28 and an annular protuberance 24 is fixed with a thread ring 22 to the housing 6. The protuberances 24 and 25 of the flow path forming members 18 and 19 are held fast against the partition walls 10 and 11. The spaces surrounding the protuberances 24 and 25 are filled with a sealant injected through either of at least two holes 30 and 31 or 32 and 33 formed respectively in the thread rings 22 and 23 so as to keen the flow path forming members 18 and 19 fixed water-tightly to the partition walls 10 and 11.

In the foregoing description, the membrane type oxygenator 1 has been portrayed as using thread rings in fixing the flow path forming members to the housing. The fast attachment may otherwise be effected by fusing the flow path forming members directly to the housing by means of high frequency waves or ultrasonic waves. Alternatively, this attachment may be effected by mutual adhesion by the use of adhesive agent. Further, the water-tight sealing of the flow path forming members to the housing may be otherwise effected by using O-rings of silicone rubber in the place of the sealant.

In the foregoing description, the oxygenator has been depicted as constructed so as to feed blood into the hollow fiber membranes and the oxygen-containing gas outside the hollow fiber membranes. This oxygenator may be otherwise constructed so that the blood will be fed outside the hollow fiber membranes and the oxygen-containing gas into the hollow fiber membranes. In this case, the oxygenator has no use for the flow path forming member on the outlet side of the oxygen-containing gas and is allowed to have the partition wall end kept open.

Figure 3:
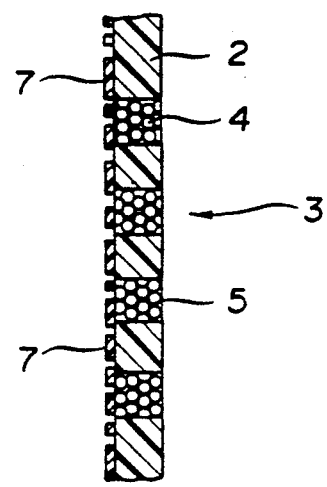

The membrane type oxygenator of this invention need not be limited to the hollow fiber membranes but may be in the form of laminated flat gas-exchange membranes, one flat gas-exchange membrane wound up in a roll, or one flat gas-exchange membrane corrugated in a zigzag, for example. The surface of the gas-exchange membrane 2 destined to contact blood is desired to be coated in the neighborhood of minute pores 3 with a water-insoluble resin 7. FIG. 3 illustrates a sectioned part of the gas-exchange membrane in a state coated with the water-insoluble resin. This coating of the water insoluble resin is intended to control the amount of the blood anticoagulant released into the blood so that the anticoagulant will be dissolved out continuously in a minute amount over a long period. To permit this continuous release of the blood anticoagulant 5 retained on the minute particles 4, the water-insoluble resin must be applied in such a manner that the produced coating will contain pores larger in diameter than the diameter of the particles of the blood anticoagulant retained on the minute particles 4. This coating of the water-insoluble resin may cover the entire surface of the gas-exchange membrane destined to contact the blood. For the fulfillment of the purpose mentioned above, the coating is only required to cover the minute pores 3 filled with the minute particles 4. This coating is desired to be formed so that the gas-exchange membrane 2 will possess a gas flux exceeding 1 ml/mmHg.m$^2$, preferably falling in the range of 2 to 200 ml/mmHg.m$^2$. The water-insoluble resin possesses a wall thickness in the range of 20 Å to 25 μm, preferably 0.005 to 1 μm.

Examples of the water-insoluble resin to be effectively used in the membrane type oxygenator of the present invention include polyalkyl sulfones, ethyl cellulose, acrylic ester type polymers, methacrylic ester type polymers such as polyhydroxyethyl methacrylate, block and graft copolymers possessing a hydrophobic segment and a hydrophilic segment such as block copolymer of hydroxyethyl methacrylate-styrene-hydroxyethyl methacrylate (HEMA-styrene-HEMA), block copolymer of hydroxyethyl methacrylate-methyl methacrylate (HEMA-MMA), block copolymer of hydroxyethyl-lauryl methacrylate (HEMA-LMA), and block copolymer of polyvinyl pyrrolidone-methyl methacrylate (PVP-MMA), and fluorine-containing resins. Desirable examples are block copolymer of HEMA-styrene-HEMA, block copolymer of HEMA-MMA, and fluorine-containing resins. Typical examples of fluorine-containing resins are polytetrafluoroethylene and polytrifluoroethylene. Particularly, vinyl type copolymers having as one comonomer thereof a vinyl monomer possessing a perfluoro-alkyl side chain prove to be advantageous because they excel in bioadaptability, film-forming property, and gas-permeating property. The vinyl type copolymer having as one comonomer thereof a vinyl monomer possessing a perfluoro-alkyl side chain is copolymer between a desired vinyl type monomer and a vinyl monomer possessing a perfluoroalkyl side chain. Preferably, the so-called A-B type block copolymers having a block of the homopolymer of a vinyl monomer possessing a perfluoro-alkyl side chain bonded to a matrix block of a desired vinyl type polymer which may be homopolymer, a block polymer, or a random polymer in form are typical examples. Examples of the vinyl monomer possessing a perfluoro-alkyl side chain include perfluoroacrylates and perfluoromethacrylates possessing as a side chain such a perfluoro-alkyl group as—$CH_2(CF_2)_2H$, —$CH_2(CF_2)_4H$, —$CH_2CF_3$, or —$CH_2CH_2(CF_2)_7CF_3$, preferably —$CH_2CH_2(CF_2)_7CF_3$.

Typical examples of the vinyl monomer which forms the matrix block include alkyl methacrylate such as methyl methacrylate, ethyl methacrylate, butyl methacrylate, and 2-ethylhexyl methacrylate and alkyl acrylates such as methyl acrylate, ethyl acrylate, and butyl acrylate. In the vinyl type block copolymer as a comonomer thereof a vinyl monomer possessing a perfluoroalkyl side chain, the gravimetric ratio of the polymer segment formed of the vinyl monomer possessing a perfluoro-alkyl side chain to the polymer segment formed of the other vinyl monomer is in the range of 0.25 to 1.5, preferably 0.3 to 1.2. This block copolymer is obtained by preparing a vinyl type polymer destined to serve as a matrix block possessing a peroxy bond in the main chain thereof and then dispersion polymerizing a perfluoroacrylate with the vinyl type polymer.

Figure 4:
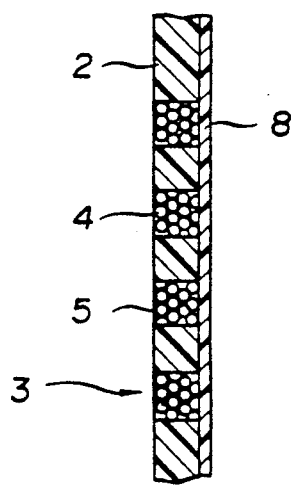
Figure 5:
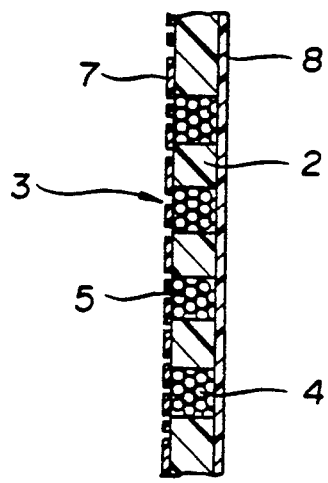

Further, the surface of the gas-exchange membrane 2 destined to contact the gas is preferably coated, at least in the neighborhood of the minute pores 3 filled with the minute particles 4, with a hydrophobic resin 8. FIG. 4 illustrates a sectioned part of the gas-exchange membrane in a state coated with the hydrophobic resin 8. This is because this coating of the hydrophobic resin is capable of preventing leakage of the blood components such as water and blood plasma in the blood during a protracted circulation. The hydrophobic resin 8 is desired to possess permeability to gas. For example, silicone and the vinyl type copolymer possessing as a comonomer thereof a vinyl monomer possessing a perfluoro-alkyl side chain can be used advantageously. The hydrophobic resin is desired to be applied so that the produced coating thereof will occlude the minute pores 3 filled with the minute particles 4 as illustrated in FIG. 4. The coating of the hydrophobic resin 8 thus occluding the minute pores 3 needs not be a perfect cover but may contain minute pores. Otherwise, the hydrophobic resin 8 may be applied so that the produced coating will hide the entire surface of the gas-exchange membrane 2 destined to contact the gas. This coating is desired to be formed in such a manner that the gas-exchange membrane will possess a gas flux exceeding 1 ml/mmHg.m$^2$, preferably falling in the range of 2 to 200 ml/mmHg.m$^2$. More desirably, the gas-exchange membrane is given the coating with the hydrophobic resin 8 and the coating with the water-insoluble resin 7. FIG. 5 illustrates a section of the gas-exchange membrane in a state possessing the two coatings mentioned above.

Now, the operation of the membrane type oxygenator of the present invention will be described below with reference to FIG. 1 which depicts a typical membrane type oxygenator embodying this invention. The membrane type oxygenator of this invention is incorporated in a path for extra-corporeal blood circulation. The blood is introduced into the membrane type oxygenator 1 through the blood inlet, brought into contact with the gas-exchange membrane 2, deprived of carbon dioxide, supplied with oxygen, and allowed to depart from the blood outlet. In this case, since the membrane type oxygenator of this invention has minute particles retained in the minute pores of the gas-exchange membrane and also has a blood anticoagulant retained in the minute particles, the blood anticoagulant dissolves out into the water from the blood when this water flows into the minute pores and this release of the blood anticoagulant occurs continuously to preclude the otherwise possible occurrence of thrombosis on the surface of the gas-exchange membrane for a long time.

Now, the method which is employed for the production of the membrane type oxygenator of this invention will be described below. The production is effected by first assembling a membrane type oxygenator 1 holding therein a porous gas-exchange membrane 2 possessing minute through pores forming a path for gas, then allowing a dispersion of minute particles 4 to flow inside the membrane type oxygenator 1 thereby enabling the minute particles to be retained inside the minute pores 4, removing the residual dispersion of minute particles 4 from within the interior of the membrane type oxygenator 1, allowing a liquid containing the blood anticoagulant to flow inside the oxygenator, and consequently allowing this liquid to flow through the minute pores 3 of the gas-exchange membrane 2 thereby inducing deposition of the blood anticoagulant 5 to the minute particles 4. Now, the method for the production of the membrane type oxygenator of this invention will be described specifically below with reference to FIG. 1 illustrating a typical hollow fiber membrane type oxygenator embodying this invention.

First, a hollow fiber membrane type oxygenator of a configuration illustrated in FIG. 1 is produced. Then, a dispersion of minute particles 4 smaller in diameter than the minute pores 3 of the gas-exchange membrane 2 is allowed to flow inside the gas-exchange membrane 2 of the oxygenator through the blood inlet 29 or the blood outlet 28 of the oxygenator 1. This flow of the dispersion inside the oxygenator is so controlled that it will partly flow out of the minute pores 3 of the gas-exchange membrane 2. As the minute particles, those already described can be used. The dispersion medium used for the dispersion is required to be stable with respect to the minute particles and the gas-exchange membrane. Examples of the dispersion medium usable advantageously herein include water, alcohols, and mixtures of water with alcohols. The content of the minute particles in the dispersion medium is desired to fall in the range of 3 to 40% by weight. Where water is used for the dispersion and the gas-exchange membrane is hydrophobic, an alcohol such as ethanol or isopropanol must be brought into contact with the surface of the gas-exchange membrane on the side for introducing the dispersion so as to impart hydrophilicity to the surface of the gas-exchange membrane before the flow of the dispersion of minute particles is started.

The flow of the dispersion inside the oxygenator is desired to be carried under application of pressure. Particularly in the case of the hollow fiber type oxygenator constructed as illustrated in FIG. 1, it is desired that the dispersion during the flow thereof through the interior of the oxygenator will be enabled to exert pressure (approximately in the range of 1 to 3 kg/cm$^2$, for example) upon the inner surface of the hollow fiber membranes as by constricting the outlet (for the dispersion) of the oxygenator and thereby increasing the resistance offered to the flow of the dispersion near the outlet of the oxygenator. Owing to this measure, the dispersion of the minute particles is enabled to flow in a favorable condition through the minute pores in the gas-exchange membrane. If the pressure thus exerted on the hollow fiber membranes is unduly high, however, it may possibly fracture the structure of the gas-exchange membranes. It is, therefore, desirable to effect the flow of the dispersion through the interior of the oxygenator after safe flow of the dispersion in the axial direction of the hollow fiber membranes, namely safe emanation of the dispersion from the outlet, has been confirmed. When the introduction of the dispersion into the hollow fiber membranes is attained by application of pressure (approximately in the range of 1 to 3 kg/cm$^2$, for example), the flow rate of the dispersion from the outlet is desired to be controlled in the range of 20 to 300 cc/min.m$^2$.

When the dispersion of the minute particles 4 is caused to flow through the gas-exchange membrane 2 in the manner described above, the minute particles 4 contained in the dispersion are caught inside the minute pores of the gas-exchange membrane 2 as though they were suffered to clog the minute pores, with the result that the minute pores will be filled with the minute particles 4 as illustrated in FIG. 2. After the minute pores 3 of the gas-exchange membrane 2 are filled up with the minute particles, the dispersion remaining on the surface of the gas-exchange membrane, or in the case of the hollow fiber type oxygenator, inside the hollow fiber membranes is removed by passing a cleaning fluid such as, for example, air or water, through the interior of the oxygenator. The flow of the cleaning fluid is desired to be carried out at a flow rate in the range of 2 to 50 liters/min. for a period in the range of 5 to 15 minutes where water is employed as the cleaning fluid. The flow of the cleaning fluid is desired to proceed in such a manner that it will avoid exerting any appreciable pressure on the surface of the gas-exchange membrane or inside the hollow fiber membranes. This is because exertion of unduly high pressure possibly results in forced release of the minute particles which have filled the minute pores of the gas-exchange membrane.

After the residual dispersion has been removed from the surface of the gas-exchange membrane, air may be passed through the interior of the oxygenator, when necessary, for the purpose of drying the gas-exchange membrane and the oxygenator as a whole. This drying, sometimes if not always, may fortify mutual adhesion of the minute particles and increase the stability of the minute particles inside the minute pores, though to a varying extent depending on the particular kind of the minute particles involved. To effect this drying advantageously, the flow volume of air is desired to be in the range of 10 to 200 liters/min., preferably 20 to 150 liters/min. at a temperature in the range of 20° to 60° C., preferably 15° to 50° C., for a period of 30 to 180 minutes, preferably 60 to 180 minutes. Thereafter, an anticoagulant solution containing the blood anticoagulant is caused to flow through the interior of the membrane type oxygenator 1. As the blood anticoagulant, heparin can be advantageously used. The solvent to be used for the anticoagulant solution is required to be capable of dissolving or dispersing the blood anticoagulant and to be stable with respect to the gas-exchange membrane. Specifically as the solvent, water or a mixture of water with an alcohol may be suitably used. The content of the anticoagulant in the anticoagulant solution is desired to be in the range of 0.2 to 5% by weight, preferably 1 to 4% by weight. Where water is used as the solvent and the gas-exchange membrane is hydrophobic, it is desired to impart hydrophilicity on the surface of the gas-exchange membrane on the side for admitting the anticoagulant solution by bringing an alcohol such as ethanol or isopropanol into contact with the surface of the gas-exchange membrane before the flow of the anticoagulant solution is started. The introduction of the anticoagulant solution is desired to be effected under application of pressure from one of the opposite sides of the gas-exchange membrane similarly to the flow of the dispersion of minute particles. One possible way of effecting this introduction may be by causing the anticoagulant solution to flow in through the blood inlet with the blood outlet of the membrane type oxygenator kept closed, allowing the anticoagulant solution to pass through the minute pores of the gas-exchange membrane filled with the minute particles, and then causing the anticoagulant solution to depart from the gas outlet or the gas inlet of the oxygenator. In this case, the flow of the anticoagulant solution is desired to be carried out at a flow rate in the range of 50 to 500 ml/min., preferably 50 to 300 ml/min. for a period in the range of 2 to 10 minutes, preferably 5 to 10 minutes. Then, in the case of the hollow fiber type oxygenator similarly to the flow of the dispersion of minute particles, the resistance to the flow of the anticoagulant solution at the outlet of the anticoagulant solution may be started after safe flow of the anticoagulant solution in the axial direction of the hollow fiber membrane, namely safe emanation of the anticoagulant solution from the outlet has been confirmed. One possible way of effecting this flow of the anticoagulant solution under pressure may be by starting the flow of the anticoagulant solution after the pressure exerted on the anticoagulant solution on the inlet side has been increased, owing to the constriction of the outlet of the anticoagulant solution in the oxygenator, to an extent such that the pressure inside the hollow fiber membrane reaches a level approximately in the range of 1 to 3 $kg/cm^2$. Then, the oxygenator may be dried after completion of the flow of the anticoagulant solution by removing the residual anticoagulant solution from within the oxygenator and subsequently blowing hot air through the interior of the oxygenator. Otherwise, this drying may be attained spontaneously.

In the manner described above, the anticoagulant can be deposited on the minute particles which fill up the minute pores in the gas-exchange membrane. As concerns the form of deposition of the anticoagulant on the minute particles, a case in which the anticoagulant is deposited astride a plurality of minute particles is conceivable. In another possible case, the anticoagulant solution is deposited on one or a plurality of minute particles and, after the subsequent volatilization of the solvent from the solution, the anticoagulant separates from the minute particles and converts itself into a powder and distributes itself between the minute particles. The membrane type oxygenator of this invention is produced as described above.

Further in the oxygenator produced by the method described above, the surface of the gas-exchange membrane 2 destined to contact the blood, at least in the areas containing the minute pores 3 filled with the minute particles 4, is desired to be coated with a water-insoluble resin. As the water-insoluble resin, that which has been already described can be used. This coating can be carried out as follows.

A water-insoluble resin solution is prepared by dissolving the water-insoluble resin in a solvent which is stable with respect to the gas-exchange membrane. When poly-HEMA, block copolymer of HEMA-styrene-HEMA, block copolymer of HEMA-MMA, block copolymer of HEMA-LMA, block copolymer of PVP-MMA, or a fluorine-containing resin (such as, for example, polytetrafluoroethylene, polytrifluoroethylene, or a vinyl type copolymer having as a comonomer a vinyl monomer having a perfluoro-alkyl side chain) is used as the water-insoluble resin, the solvent used therefor may be an organic solvent. Examples of the organic solvent used advantageously for the solution include ketones such as acetone, methylethyl ketone, methylisobutyl ketone, and cyclohexane, alcohols such as methanol, ethanol, n-butanol, and sec-butanol, esters such as ethyl acetate and butyl acetate, ethers such as dimethyl formamide, tetrahydrofuran, diethyl ether, methyl cellosolve, and ethyl cellosolve, and chloroform. The concentration of the water-insoluble resin in the water-insoluble resin solution is desired to be in the range of 0.1 to 10% by weight, preferably 0.5 to 10% by weight, although it cannot be made a sweeping statement.

When a vinyl type block copolymer having as a comonomer thereof a vinyl monomer possessing a perfluoro-alkyl side chain is used as the water-insoluble resin, any of the organic solvents may be used as the solvent for the water-insoluble resin. Particularly, one ketone or a mixture of two or more ketones or a mixture of a ketone with an alcohol can be used advantageously for the water-insoluble resin. The solvent is desired to be such that it will be vaporized on the gas-exchange membrane as controlled efficiently. As examples of the solvent which meets this requirement, there can be cited a 4/6 (volumetric ratio) methylethyl ketone/methyl isobutyl ketone mixture or a (4/6)90 (volumetic ratio) (methylethyl ketone/methylisobutyl ketone)/ethanol mixture. The concentration of the vinyl type block copolymer in the solution is desired to be in the range of 0.5 to 10% by weight, preferably 0.5 to 10% by weight. Also when the block copolymer of HEMA/MMA is used, the coating can be easily attained by using a 1/9 (volumetric ratio) methyl cellosolve/methanol mixture as the solvent.

The water-insoluble resin solution obtained as described above is brought into contact with the surface of the gas-exchange membrane of the oxygenator destined to contact the blood. This contact can be attained by causing the solution of flow through the interior of the oxygenator via the blood inlet. For the purpose of preventing this solution from appreciably entering the minute pores during the passage of the solution through the oxygenator, the flow of the solution is desired to be carried out with the gas inlet and the gas outlet on the other surface of the gas-exchange membrane (the gas inlet side) kept closed. By this measure, the coating of the water-insoluble resin can be formed on the surface of the gas-exchange membrane 2 containing the minute pores filled with the minute particles 4 and falling on the side destined to contact the blood. The coating of the water-insoluble resin is so effected that pores larger than the particles of the blood anticoagulant are formed in the produced coating to ensure safe release of the blood anticoagulant 5 retained on the minute articles 4. The formation of the pores in the produced coating is attained by suitable selection of the concentration of the water-insoluble resin in the solution. So long as this concentration falls in the range mentioned above, the pores larger than the particles of the blood anticoagulant are formed in the coating.

Further, the surface of the gas-exchange membrane designed to contact the gas, at least in the area containing the minute pores filled with the minute particles, is desired to be coated with a hydrophobic resin. This coating of the hydrophobic resin is desired to be formed in such a manner as to occlude the minute pores. This coating may be in the form of a perfect closure. Otherwise, it may be formed so as to contain therein minute pores. Owing to the coating of the hydrophobic resin, the other possible leakage of the blood components (such as water and blood plasma) from the blood during a protracted circulation of blood can be precluded.

The coating with the hydrophobic resin can be carried out as follows. First, a solution of the hydrophobic resin in a solvent which is stable with respect to the gas-exchange membrane is prepared. The hydrophobic resin is desired to be capable of exhibiting to the gas (high permeability to $O_2$ and $CO_2$). Examples of the hydrophobic resin advantageously usable for this purpose include silicones such as dimethyl silicone oil, ethylphenyl, silicone oil, methylchlorophenyl silicone oil, branched dimethyl silicone oil, two-liquid type RTV silicone rubber (such as polymer of vinylmethyl siloxane and methyl hydrogen siloxane), and mixtures of one-liquid type RTV silicone rubber with the silicone oils, and the vinyl type copoymers having as a comonomer thereof a vinyl monomer possessing a perfluoroalkyl side chain. Examples of the solvent usable advantageously when a silicone is employed as the hydrophobic resin include benzene, toluene, xylene, hexane, dichloromethane, methylethyl ketone, difluoroethane, ethyl acetate, trichloroethane, and mixtures thereof. When the two-liquid type RTV silicone rubber mixture is employed as the hydrophobic resin, the solvent is desired to incorporate therein, as a curing cross-linking agent, a platinum family metal in an elementary form or in the form of an oxide or compound. For example, the cross-linking agent may be platinic chloride.

When a vinyl type copolymer having as a comonomer thereof a vinyl monomer possessing a perfluoroalkyl side chain is employed as the hydrophobic resin, any of the solvents cited above can be used. In this case, the concentration of the vinyl type block copolymer in the solution is desired to be in the range of 0.5 to 10% by weight, preferably 0.5 to 5% by weight. When a silicone oil or a mixture of a silicone oil with a silicone rubber is used, the concentration thereof in the solution is desired to be in the range of 0.1 to 20% by weight, preferably 0.5 to 5% by weight. This hydrophobic resin solution is brought into contact with the surface of the gas-exchange membrane of the oxygenator destined to contact the gas. This contact is attained by causing the solution to flow through the oxygenator via the gas inlet, for example. During the passage of this solution through the oxygenator, for the purpose of preventing the solution from appreciably entering the minute pores, the passage of the solution is desired to be carried out with the blood inlet and the outlet on the other surface of the gas-exchange membrane kept closed. As the result, the coating of the hydrophobic resin can be formed on the surface of the gas-exchange membrane on the side containing the minute pores 3 filled with the minute particles 4 and destined to contact the gas. The coating formed with the hydrophobic resin is desired to have a thickness approximately in the range of 0.001 to 25 $\mu$m, preferably 0.005 to 1 $\mu$m.

Now, the other method by which the membrane type oxygenator of the present invention is produced will be described below with reference to FIG. 1 illustrating a hollow fiber type oxygenator 1. This method comprises first assembling a membrane type oxygenator 1 containing therein a porous gas-exchange membrane 2 possessing minute through pores forming a path for gas, then causing a dispersion containing a blood anticoagulant 5 and minute particles 4 to flow through the interior of the membrane type oxygenator 1, allowing the minute pores 3 to take hold of the minute particles 4 in conjunction with the blood anticoagulant 5, and removing the dispersion remaining in the interior of the membrane type oxygenator 1.

Now, the method by which the production is effected will be described more specifically below with reference to FIG. 1 which illustrates a hollow fiber type oxygenator. First, a hollow fiber type oxygenator constructed as illustrated in FIG. 1 is produced. Then, a dispersion containing minute particles 4 smaller than the minute pores 3 of the gas-exchange membrane 2 and the blood anticoagulant is caused to flow into the interior of the gas-exchange membrane 2 of the oxygenator through the blood inlet 29 or the blood outlet 28 of the membrane type oxygenator 1. The flow of the dispersion inside the oxygenator is so carried out that part of the dispersion will flow out of the minute pores 3 of the gas-exchange membrane 2. As the minute particles, those of the quality already mentioned can be used. The dispersion medium to be used for the dispersion is desired to be capable of dissolving the blood anticoagulant and to be stable with respect to the minute particles and the gas-exchange membrane. As the dispersion medium, water or a mixture of water with an alcohol can be advantageously used. The content of the minute particle in the dispersion is desired to be approximately in the range of 3 to 40% by weight, preferably 5 to 20% by weight. The content of the blood anticoagulant in the dispersion is desired to be approximately in the range of 0.2 to 5% by weight, preferably 1 to 4% by weight.

When water is employed as the dispersion medium and the gas-exchange membrane is made of a hydrophobic material, it is necessary to impart hydrophilicity to the surface of the gas-exchange membrane on the side for admitting the dispersion by bringing an alcohol such as ethanol or isopropanol into contact with the surface just mentioned before the flow of the dispersion is started. The flow of the dispersion into the oxygenator is desired to be effected under application of pressure. Particularly in the case of the hollow fiber type oxygenator constructed as illustrated in FIG. 1, the pressure (approximately in the range of 1 to 3 kg/cm$^2$, for example) is desired to be exerted on the interior of the hollow fiber membrane as by constricting the outlet (the outlet for the dispersion) of the oxygenator thereby increasing the resistance offered to the flow of the dispersion departing from the oxygenator. By this measure, the dispersion of minute particles is enabled to pass through the minute pores of the gas-exchange membrane more favorably. If the pressure so exerted on the gas-exchange membrane is unduly large, it possibly fractures the structure of the gas-exchange membrane. Thus, the exertion of the pressure is desired to be continued after safe flow of the dispersion in the axial direction of the hollow fiber membranes, namely safe emanation of the dispersion from the outlet (the outlet for the dispersion) of the oxygenator, has been confirmed. When the introduction of the dispersion is effected by application of pressure (approximately in the range of 1 to 3 kg/cm$^2$, for example) to the interior of the hollow fiber membranes, the flow volume of the dispersion is desired to be in the range of 20 to 300 cc/min.m$^2$, preferably 40 to 150 cc/min.mm$^2$.

When the dispersion containing minute particles 4 is passed inside the gas-exchange membrane 2, the minute particles 4 contained in the dispersion are caught inside the minute pores 3 of the gas-exchange membrane 2 as though they were suffered to clog the minute pores 3, with the result that the minute pores will be filled with the minute particles 4 and with the blood anticoagulant 5 as well. After the minute pores of the gas-exchange membrane have been filled with the minute particles, the dispersion remaining on the surface of the gas-exchange membrane or, in the case of the hollow fiber type oxygenator, in the hollow fiber membranes is removed by passage of a cleaning fluid such as, for example, air or water through the interior of the oxygenator. The flow of the cleaning fluid, when water is employed as the cleaning fluid, is desired to be effected at a flow volume approximately in the range of 2 to 50 liters/min., preferably 10 to 50 liters/min, for a period approximately in the range of 5 to 15 minutes, preferably 10 to 15 minutes. The flow of the cleaning fluid is desired to be made in such a manner that no appreciable pressure will be exerted on the surface of the gas-exchange membrane or the interior of the hollow fiber membranes. This is because application of unduly high pressure will possibly induce forced release of the minute particles lodged intentionally in the minute pores of the gas-exchange membrane.

After the residual dispersion has been removed from the surface of the gas-exchange membrane, the gas-exchange membrane and the oxygenator as a whole are dried, when necessary, by causing air to flow through the interior of the oxygenator. This drying, sometimes if not always, can fortify the mutual adhesion of minute particles and enhance the stability of the minute particles within the minute pores. The air to be used for this drying is desired to passed at a flow volume approximately in the range of 10 to 200 liters/min.m$^2$, preferably 50 to 150 liters/mim.m$^2$, for a period approximately in the range of 30 to 180 minutes, preferably 120 to 180 minutes. In the oxygenator produced by the method described above, the surface of the gas-exchange membrane on the side destined to contact the blood, at least in the areas containing the minute pores filled with the minute particles, is desired to be coated with a water-insoluble resin. Further, the minute pores on the surface of the gas-exchange membrane of this oxygenator on the side destined to contact the gas are desired to be coated with a hydrophobic resin.

Now, the present invention will be described more specifically below with reference to working examples.

EXAMPLE 1

A hollow fiber type oxygenator was produced in a form as illustrated in FIG. 1 by packing a housing with about 12,000 hollow fiber membranes of polypropylene possessing an inside diameter of 200 pm, a wall thickness of 25 $\mu$m, a porosity of 45%, and an average pore diameter of 700 Å. The membrane surface area of this oxygenator was about 0.8 m$^2$. Through the blppd inlet of this hollow fiber type oxygenator, 100 ml of ethanol was introduced and then 500 ml of distilled water was introduced to displace the ethanol for imparting hydrophilicity to the inner surface of the hollow fiber membranes. Then, a dispersion containing 17.5% by weight of colloidal silica possessing particle diameters of 70 to 200 Å (average particle diameter of 115 Å) (mixture of Snowtex 40 (particle diameters of 100–200 Å) and Snowtex S (particle diameters of 70–90 Å), produced by Nissan Chemicals Industries, Ltd. and marketed under trademark designation of "Snowtex") was prepared. Water was used as the dispersion medium for this dispersion. A total of 1,000 cc of this dispersion of colloidal silica was caused to flow through the oxygenator via the blood inlet under application of pressure of 2 kg/cm$^2$ to the interior of the hollow fiber membranes, with the discharge volume of the dispersion through the blood outlet controlled to 70 cc/min by means of a cock attached to the blood outlet, for the purpose of filling the minute pores of the hollow fiber membranes with the minute sili colloid particles. Subsequently, tap water was caused to flow through the oxygenator via the blood inlet at a rate of 10 liters/min. for 10 minutes to remove the excess dispersion from within the hollow fiber membranes. Thereafter, the oxygenator was dried by blowing air therethrough at a rate of 100 liters/min. Then, 100 ml of ethanol was again caused to flow through the oxygenator via the blood inlet and 500 ml of distilled water was similarly passed to displace the ethanol, for the purpose of imparting hydrophilicity to the inner surface of the hollow fiber membranes. Subsequently, an aqueous 2 wt % heparin solution was passed through the hollow fiber membranes from the inside to the outside at a rate of 100 ml/min. for 10 minutes, for the purpose of effecting deposition of heparin on the colloidal silica. This oxygenator was labeled as Example 1. Under an electron microscope, the minute pores in the hollow, fiber membranes of the oxygenator were substantially absent from sight.

CONTROL 1

A hollow fiber membrane type oxygenator was produced by packing a housing with about 12,000 hollow fiber membranes of polypropylene possessing an inside diameter of 200 μm, a wall thickness of 25 μm, a porosity of 45% and an average pore diameter of 700 Å. The membrane surface area of this oxygenator was about 0.8 m². Through the blood inlet of this hollow fiber membrane type oxygenator, 100 ml of ethanol was introduced and then 500 ml of distilled water was introduced to displace the ethanol, for the purpose of imparting hydrophilicity to the inner surface of the hollow fiber membranes. An aqueous 2 wt % heparin solution was passed through the hollow fiber membranes from the inside to the outside at a rate of 100 ml/min. for 10 minutes, for the purpose of inducing deposition of heparin on the hollow fiber membranes. This oxygenator was labeled as Control.

EXAMPLE 2

A solution containing 6% by weight of an A-B type block copolymer of HEMA-MMA (product of Nippon Oils & Fats Co., Ltd. marketed under trademark designation of "Modiper HM18") in a ⅓ (volumetric ratio) methyl cellosolve/methanol mixture as a solvent was prepared. Via the blood inlet of the oxygenator of Example 1, 150 ml of the solution was passed under a head-drop pressure of 40 cm, for the purpose for forming a coating of the block copolymer on the surface of the hollow fiber membranes on the side destined to contact the blood. The oxygenator thus obtained was labeled as Example 2.

EXAMPLE 3

A solution containing 5% by weight of a [(25:25):50] (gravimetric ratio) (methyl methacrylate/butyl methacrylate)-(perfluoropropyl acrylate) copolymer (product of Nippon Oils & Fats Co. , Ltd. marketed under trademark designation of "modiper F100") in a 4:6:90 (volumetric ratio) methylethyl ketone/methylisobutyl ketone/ethanol mixture as a solvent was prepared. Via the blood inlet of the oxygenator of Example 1, 150 ml of this solution was passed under a head-drop pressure of 40 cm, for the purpose of forming a coating of the copolymer on the surface of the hollow fiber membranes. This oxygenator was labeled as Example 3.

EXAMPLE 4

A solution of 2% by weight of dimethyl siloxane in dichlorodifuloroethane was prepared. Via the gas inlet of the oxygenator of Example 1, 200 ml of this solution was passed through the oxygenator under a head-drop pressure of 40 cm for the purpose of forming a coating of the silicone oil on the surface of the hollow fiber membranes on the side destined to contact the gas. The oxygenator thus obtained was labeled as Example 4.

EXAMPLE 5

A solution containing 6% by weight of an A-B type block copolymer of HEMA-MMA (product of Nippon Oils & Fats Co., Ltd. marketed under trademark designation of "Modiper HM-18") in a ⅓ (volumetric ratio) methyl cellosolve/methanol mixture as a solvent. Via the blood inlet of the oxygenator of Example 1, 150 ml of this solution was passed through the oxygenator under a head-drop pressure of 40 cm, for the purpose of forming a coating of the copolymer on the surface of the hollow fiber membranes destined to contact the blood. Then, a solution containing 2% by weight of 50/50 (gravimetric ratio) dimethyl siloxane/silicone oil was prepared. Via the gas inlet of the oxygenator, 200 ml of this solution was passed through the oxygenator under a head-drop pressure of 40 cm, for the purpose of forming a coating of silicone on the surface of the hollow fiber membranes destined to contact the gas. The oxygenator thus produced was labeled as Example 5.

EXPERIMENT 1

Figure 6:
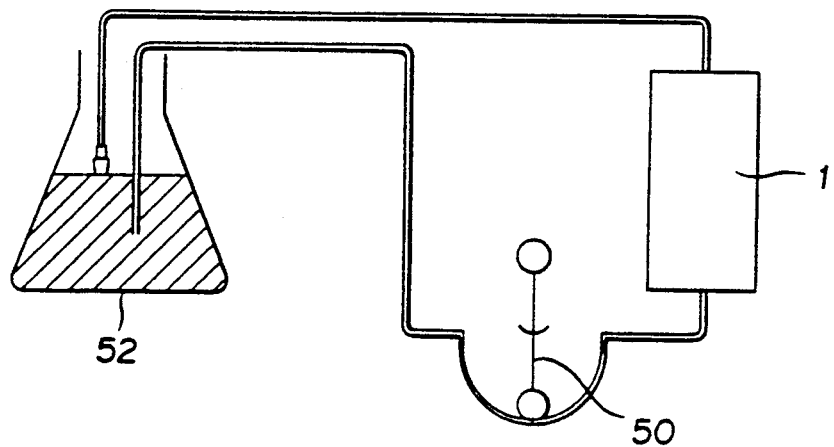
FIG. 6 is a diagram illustrating a path used in an experiment performed on the membrane type oxygenator of the present invention.

The oxygenator of Examples 1 to 5 and Control were each inserted in a path for circulation configurated as illustrated in FIG. 6 and tested. In the diagram, the reference numeral 50 stands for a pump and the reference numeral 52 for a flask. In the test, 200 ml of physiological saline solution was circulated through a given oxygenator at a flow volume of 200 ml/min to induce elution of heparin. The heparin concentration in the physiological saline solution was determined by the method of aldehyde determination due to deamination of heparin. The results were as shown in Table 1.

On the presumption that actuation of the oxygenator would possibly require priming, the oxygenator was precleaned by passing 200 ml of other physiological saline solution through the oxygenator at a flow volume of 200 ml/min, for 5 minutes before the circulation of physiological saline solution was started. The gas inlet and the gas outlet of each of the oxygenators were kept tightly closed with polyvinyl chloride tubes.

TABLE 1

| Circulation time (hours) | Heparin concentration (μg/cc) | | | | | |
| --- | --- | --- | --- | --- | --- | --- |
| | Example 1 | Example 2 | Example 3 | Example 4 | Example 5 | Control |
| 2 | 347 | 139 | 22 | 334 | 107 | 165 |
| 4 | 413 | 171 | 28 | 390 | 138 | 201 |
| 6 | 430 | 184 | 30 | 402 | 154 | 208 |
| 9 | 442 | 212 | 32 | 417 | 181 | 212 |
| 24 | 468 | 248 | 42 | 434 | 221 | 218 |
| 48 | 495 | 280 | 50 | 463 | 245 | 222 |
| 96 | 514 | 338 | 62 | 480 | 303 | 220 |
| 168 | 540 | 412 | 76 | 501 | 393 | 224 |

It is clearly noted from the results given in Table 1 that in the oxygenators of Examples 1 to 5 embodying this invention, the heparin concentrations gradually increased with the elapse of circulation time. In contrast in the oxygenator of Control, the heparin concentration rose between the two to four hours of circulation time and showed substantially no increase thereafter. The results indicate that in the oxygenators of the working examples of this invention, heparin would be continuously released into the blood in actual service. Frequently, thrombosis occurs owing to the contact of blood components with minute pores in a gas-exchange membrane. The occurrence of thrombosis in the areas of minute pores ought to be precluded when the minute pores are allowed to release heparin continuously, though in a low concentration. The test results further indicate that in the oxygenator of Control, no continuous release of heparin was obtained.

EXPERIMENT 2

Through the oxygenators of Examples 1 to 5 and the oxygenator of Control, heparin-added bovine blood plasma was circulated at a flow volume of 0.5 liter/min. under application of outlet pressure of 200 mmhg for 48 hours. The results were as shown in Table 2.

TABLE 2

| Circulation time (hours) | Amount of leakage of plasma components | | | | | |
|---|---|---|---|---|---|---|
| | Example 1 | Example 2 | Example 3 | Example 4 | Example 5 | Control |
| 2  | 0   | 0  | 0 | 0  | 0 | 0   |
| 4  | 0   | 0  | 0 | 0  | 0 | 0   |
| 6  | 0   | 0  | 0 | 0  | 0 | 0   |
| 9  | 6   | 0  | 0 | 0  | 0 | 0   |
| 15 | 21  | 2  | 0 | 0  | 0 | 8   |
| 24 | 70  | 10 | 0 | 0  | 0 | 35  |
| 36 | 160 | 21 | 0 | 8  | 1 | 174 |
| 48 | 192 | 36 | 0 | 18 | 0 | 350 |

EXPERIMENT 3

Miniature modules of oxygenator having an available surface area of 0.015 m2 were cut from the hollow fiber membranes of the oxygenators of Example 1 to 5 and Control. These miniature modules were inserted in the carotid artery-jugular vein (A-V) bypasses of rabbits to permit passage of blood at a flow volume of 8 ml/min. In the miniature module using the hollow fiber membranes of Control, the hollow fiber membrane were substantially completely clogged after about two hours' circulation time. In the miniature modules using the hollow fiber membranes of Examples 1 to 5, no increase in pressure loss was detected. The results indicate that the no clogging of hollow fiber membranes occurred in the miniature modules using the hollow fiber membranes of Examples 1 to 5.

EXPERIMENT 4

The oxygenators of Examples 1 to 5 and Control were tested for gas-exchange capacity, using a venous blood of the conditions of $O_2$ saturation degree of the venous blood ($SvO_2$) 65±5%, hemoglobin (Hbg) 12.1 g/dl, excess amount of a base (Be) 1 mEq/lit., $CO_2$ partial pressure of the base ($PvCO_2$) 46±3 mmHg, Temp 37°±0.5° C. under amount of blood flow (Q)B 0.3, 0.6, and 0.8 lit.min. and V/Q 1.0. The results indicate absence of difference in gas-exchange capacity.

INDUSTRIAL APPLICABILITY

The membrane type oxygenator of this invention effects exchange of gases, and by the use of a porous gas-exchange membrane possessing minute through pores forming a path for gas, having minute particles tained in the minute pores to decrease the cross-sectional area of the path for gas, and further having a blood anticoagulant retained in or between the minute particles. When the water component of the blood flowed into the minute pores, the blood anticoagulant is released from the minute particles into the water component. Since this elution of the blood anticoagulant is made continuously, the otherwise possible occurrence of thrombosis on the surface of the gas-exchange membrane can be prevented for a long time. In the oxygenator of the present invention, therefore, the circulation of blood can be continued with a small consumption of heparin. Further by coating the surface of the gas-exchange membrane on the side destined to contact the blood, at least in the areas containing the minute pores retaining the minute particles, with a water-insoluble resin, the amount of the blood anticoagulant to be eluted can be notably decreased and the period for the release of the blood anticoagulant into the blood can be proportionately lengthened. Moreover, by coating the surface of the gas-exchange membrane on the side destined to contact the gas, at least in the areas containing the minute pores retaining the minute particles, with a hydrophobic resin, the otherwise possible separation of the blood plasma component from the blood can be prevented even when the circulation of blood through the oxygenator is continued for a long time.

The method of the present invention for the production of the membrane type oxygenator comprises assembling a membrane type oxygenator holding therein a porous gas-exchange membrane possessing minute through pores forming a path for gas, then ca a dispersion of minute particles to flow through the interior of the membrane type oxygenator thereby allowing the minute pores to be filled with the minute particles, removing the dispersion remaining inside the membrane type oxygenator, and further causing a liquid containing a blood anticoagulant to flow through the interior of the oxygenator and allowing this liquid to pass through the oxygenator holding therein a porous gas-exchange membrane possessing minute through pores forming a path for gas, then causing a dispersion of minute particles containing a blood anticoagulant to flow through the interior of the membrane type oxygenator thereby filling the minute pores with the minute particles and then removing the dispersion remaining inside the membrane type oxygenator. The membrane type oxygenator of the present invention, therefore, can be manufactured with ease.

I claim:

1. A membrane type oxygenator for effecting exchange of gases comprising:
   a porous gas-exchange membrane possessing minute through-pores for passage of gas,
   minute particles retained within said minute through-pores in said porous gas-exchange membrane to decrease the cross-sectional area thereof, and
   a blood anticoagulant retained by said minute particles or between adjacent ones of said minute particles.

2. A membrane type oxygenator according to claim 1, wherein said gas-exchange membrane has a wall thickness in the range of 5 to 80 μm, and said minute through-pores having diameters in the range of 0.01 to 5 μm.

3. A membrane type oxygenator according to claim 1, wherein said gas-exchange membrane comprises hollow fiber membranes.

4. A membrane type oxygenator according to claim 3, wherein said hollow fiber membranes possess inside diameters in the range of 100 to 1,000 μm.

5. A membrane type oxygenator according to claim 1, wherein said minute particles possess diameters smaller than diameters of said minute pores.

6. A membrane type oxygenator according to claim 5, wherein said minute pores of said gas-exchange membrane are crammed with said minute particles in such a manner than gaps between adjacent ones of said minute particles form a path for gas.

7. A membrane type oxygenator according to claim 1, wherein said minute particles are formed of silica.

8. A membrane type oxygenator according to claim 1, wherein said minute particles possess diameters in the range of 20 to 10,000 Å.

9. A membrane type oxygenator according to claim 1, wherein said blood anticoagulant is heparin.

10. A membrane type oxygenator according to claim 1, wherein said gas-exchange membrane is a porous membrane made of polyolefin.

11. A membrane type oxygenator according to claim 1, wherein said gas-exchange membrane has a first surface which is coated with a water-insoluble resin at locations neighboring said minute pores.

12. A membrane type oxygenator according to claim 1, wherein said minute pores of said gas-exchange membrane are crammed with said minute particles, said gas-exchange membrane having a first surface, and wherein surfaces of said minute particles are coated with a water-insoluble resin on a side of said first surface, so as to maintain said blood anticoagulant on or between said minute particles.

13. A membrane type oxygenator according to claim 11, wherein said water-insoluble resin covers the entire said first surface of said gas-exchange membrane.

14. A membrane type oxygenator according to claim 1, wherein said gas-exchange membrane has a second surface which is coated with a hydrophobic resin.

15. A membrane type oxygenator according to claim 14, wherein said hydrophobic resin is a resin possessing high permeability to gas.

16. A membrane type oxygenator according to claim 14, wherein said hydrophobic resin covers the entire said second surface of said gas-exchange membrane.

* * * * *

UNITED STATES PATENT AND TRADEMARK OFFICE
CERTIFICATE OF CORRECTION

PATENT NO. : 5,294,401
DATED : March 15, 1994
INVENTOR(S) : Kazuhiko HAGIWARA

It is certified that error appears in the above-identified patent and that said Letters Patent is hereby corrected as shown below:

In Column 5, line 44, delete "300 m" and insert -- 300 $\mu$m --.

In Column 6, line 61, delete "scribed" and insert -- described --.

In Column 13, line 59, after "exhibiting" insert -- permeability --.

In Column 16, line 13, delete "passed" and insert -- pass --.

In Column 16, line 33, delete "200 m" and insert -- 200 $\mu$m --.

In Column 16, line 36, delete "blppd" and insert -- blood --.

In Column 16, line 57, delete "sili" and insert -- silica --.

In Column 19, line 54, delete "and" and insert -- $CO_2$ and $O_2$, --.

In Column 19, line 57, delete "tained" and insert -- retained --.

In Column 20, line 20, delete "ca" and insert -- causing --.

In Column 20, line 67, delete "than" and insert -- that --.

Signed and Sealed this

Sixteenth Day of August, 1994

Attest:

BRUCE LEHMAN

*Attesting Officer*     *Commissioner of Patents and Trademarks*